United States Patent
Gockel et al.

(10) Patent No.: US 11,913,621 B2
(45) Date of Patent: Feb. 27, 2024

(54) VEHICLE HEADLIGHT FAN SYSTEM WITH BAYONET CONNECTORS

(71) Applicant: HELLA GmbH & Co. KGaA, Lippstadt (DE)

(72) Inventors: Annhild Gockel, Bueren (DE); Sebastian Scholz, Soest (DE); Ralf Seiger, Lippstadt (DE); Franz-Georg Willeke, Anroechte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/984,843

(22) Filed: Nov. 10, 2022

(65) Prior Publication Data

US 2023/0074354 A1   Mar. 9, 2023

Related U.S. Application Data

(63) Continuation of application No. PCT/EP2021/061710, filed on May 4, 2021.

(30) Foreign Application Priority Data

May 13, 2020   (DE) ..................... 10 2020 112 963.7

(51) Int. Cl.
  *F21S 45/49* (2018.01)
  *F21S 45/43* (2018.01)
  *B60Q 1/04* (2006.01)
(52) U.S. Cl.
  CPC ............... *F21S 45/49* (2018.01); *B60Q 1/04* (2013.01); *F21S 45/43* (2018.01); *B60Q 2200/00* (2013.01)

(58) Field of Classification Search
  CPC .................................. F21S 45/49; B60Q 1/04
  (Continued)

(56) References Cited

U.S. PATENT DOCUMENTS 1,834,318 A * 12/1931 Phillips .............. H01R 33/9555
  362/651
2,110,133 A *  3/1938 Douglas ................ F21S 41/194
  362/651

(Continued)

FOREIGN PATENT DOCUMENTS

DE         20214536 U1    12/2002
DE     102010045899 B3     2/2012

(Continued)

OTHER PUBLICATIONS

International Search Report dated Jul. 28, 2021 in corresponding application PCT/EP2021/061710.

*Primary Examiner* — Ismael Negron
(74) *Attorney, Agent, or Firm* — Muncy, Geissler, Olds & Lowe , P.C.

(57) ABSTRACT

A fan system includes a fan mount having a main body with at least two bayonet guides, and a fan having at least two bayonet elements configured to be coupled to the bayonet guides to form a bayonet joint. Each of the bayonet guides include a bayonet arm fastened to and extending spaced apart from the main body. The fan is coupled to the fan mount by moving towards the main body in an axial direction, then rotating it such that the bayonet elements engage the bayonet guides, with each of the bayonet arms securing a corresponding bayonet element against the main body. The fan system is used in a vehicle headlight.

15 Claims, 8 Drawing Sheets

(58) Field of Classification Search
USPC .......................................................... 362/651
See application file for complete search history.

(56) References Cited

U.S. PATENT DOCUMENTS

| | | | |
|---|---|---|---|
| 7,621,667 B2* | 11/2009 | Behr .................. | F21V 29/54 |
| | | | 362/651 |
| 7,905,626 B2* | 3/2011 | Shantha ............... | H01J 61/327 |
| | | | 362/651 |
| 8,602,597 B2* | 12/2013 | Lopez ................. | F21V 29/85 |
| | | | 362/651 |
| 8,845,146 B2* | 9/2014 | Blankestijn ........... | F21V 29/71 |
| | | | 362/651 |
| 9,395,073 B2* | 7/2016 | Sato ................... | H01L 23/467 |
| 9,618,176 B2 | 4/2017 | Hansmann et al. | |
| 9,863,614 B2 | 1/2018 | Seki et al. | |
| 10,731,668 B2* | 8/2020 | Scholz ................. | F04D 29/646 |
| 10,752,159 B2* | 8/2020 | Ruckebusch ........... | F21S 45/49 |
| 10,865,953 B2 | 12/2020 | Yu et al. | |
| 11,746,986 B2* | 9/2023 | Hlavach .............. | F21S 45/435 |
| | | | 362/294 |
| 2010/0111698 A1* | 5/2010 | Wiedeman ............ | F04D 29/40 |
| | | | 416/189 |
| 2010/0300648 A1 | 12/2010 | Grantham | |
| 2014/0022807 A1* | 1/2014 | Watanabe ............. | F21S 41/19 |
| | | | 362/512 |
| 2016/0201882 A1 | 7/2016 | Liu et al. | |
| 2023/0147387 A1* | 5/2023 | Zubaj .................. | F21S 45/42 |
| | | | 315/76 |

FOREIGN PATENT DOCUMENTS

| | | |
|---|---|---|
| DE | 102014106502 A1 | 11/2015 |
| DE | 102017110740 A1 | 11/2018 |
| EP | 2679883 A2 | 1/2014 |
| EP | 2813750 A1 | 12/2014 |
| EP | 3557122 A1 | 10/2019 |
| EP | 3628917 A1 | 4/2020 |
| JP | 2010262903 A | 11/2010 |

* cited by examiner

VEHICLE HEADLIGHT FAN SYSTEM WITH BAYONET CONNECTORS

This nonprovisional application is a continuation of International Application No. PCT/EP2021/061710, which was filed on May 4, 2021, and which claims priority to German Patent Application No. 10 2020 112 963.7, which was filed in Germany on May 13, 2020, and which are both herein incorporated by reference.

BACKGROUND OF THE INVENTION

Field of the Invention

The present invention relates to a fan system for a headlight of a motor vehicle according to the preamble of claim 1 and a headlight having such a fan system and a motor vehicle having at least one such headlight.

DESCRIPTION OF THE BACKGROUND ART

EP 2 679 883 A2 describes a lighting device with a fan, wherein the fan is detachably connectable with the lighting device by means of a bayoneting device. A mounting plate is provided with bayoneting openings, in which a fan adapter with bayoneting hooks is fitted. The fan is fitted into a corresponding mount of the fan adapter.

It is desirable to improve the mountability of fans in state-of-the-art headlights and to keep the costs of installation as low as possible.

SUMMARY OF THE INVENTION

It is therefore an object of the present invention to provide a fan system with fan mount and fan for a headlight which is mountable in a particularly simple, fast, cost-effective and safe manner as compared to the fan systems used in known headlights.

In an exemplary embodiment, the object is achieved by a fan system for a headlight of a motor vehicle, a headlight for a motor vehicle, and a motor vehicle. Further advantages and details of the invention result from the subclaims, the description and the drawings. In this case, features and details disclosed in connection with the fan system according to the invention also apply, of course, in connection with the headlight according to the invention and the motor vehicle according to the invention and vice versa in each case, so that with regard to the disclosure the individual aspects of the invention are or can always be reciprocally referenced.

According to an exemplary aspect of the invention, the object is achieved by a fan system for a headlight of a motor vehicle, wherein the fan system comprises a fan mount which is designed to be fastened to a housing of the headlight and has at least two bayonet guides, and comprises a fan having at least two bayonet elements, and wherein the bayonet guides and the bayonet elements form a bayonet joint, by means of which the fan is or can be fastened to the fan mount by means of a plug-in movement of the fan into the fan mount in an axial direction and a rotational movement of the bayonet elements into the bayonet guides in a rotational direction, wherein each of the bayonet guides is formed between a main body of the fan mount and a bayonet arm of the relevant one of the bayonet guides, wherein each of the bayonet arms is fastened to the main body and is spaced apart from the main body in a direction counter to the axial direction.

Accordingly, a fan system with a bayonet joint is provided for a headlight, which is particularly simple, fast, cost-effective and safe to mount and disassemble. For mounting, the fan only has to be moved to the fan mount by means of a plug-in movement and then the bayonet joint must be produced by the rotational movement. The bayonet joint is made by rotating the bayonet elements of the fan in the rotational direction, whereby the bayonet elements are brought into the bayonet guides between the main body and the bayonet arms, in particular clamped between them.

It may be provided that at least one bayonet arm has a connecting section by means of which the at least one bayonet arm is fastened to the main body, and which extends transversely to the main body and counter to the axial direction. The connecting section may extend in particular angled, furthermore in particular vertically or substantially perpendicular to the main body. The fact that the connecting section extends in the direction counter to the axial direction means that it has an extension in that direction but it may also extend in other directions in addition to that direction. In particular, the connecting section may extend mainly in the direction counter to the axial direction. In particular, each of the bayonet arms may comprise a connecting section by means of which each of the bayonet arms is fastened to the main body and which extends transversely to the main body and at least in the direction counter to the axial direction.

It may be provided that at least one of the bayonet arms with connecting section further has a free end and extends from its end opposite the free end transversely from the connecting section and counter to the rotational direction. The at least one bayonet arm may extend in particular angled, furthermore in particular vertically or substantially perpendicular to the connecting section. The fact that at least one bayonet arm extends counter to the rotational direction means that it has an extension in this direction, but it can also extend in other directions in addition to this direction. In particular, the at least one bayonet arm may extend mainly counter to the rotational direction. In particular, each of the bayonet arms with a connecting section may also have a free end and extend from its opposite end transversely from its connecting section and counter to the rotational direction.

Further, it may be provided that the at least one connecting section forms a stop to which one of the bayonet elements is applied when the fan is fastened to the fan mount. This ensures a stable contact at the stop, which brings the at least one bayonet element safely into a desired end position in the bayonet guide. The system can be, for example, a point system or line system.

It may also be provided that at least one of the bayonet arms with connecting section has an oversized area in which one of the bayonet elements is fixed between the main body and the bayonet arm when the fan is fastened to the fan mount. In particular, the bayonet element is clamped between the bayonet arm with the oversized area and the main body. This ensures that the fan cannot move in the axial direction with respect to the fan mount. This keeps the fan rattle-free during operation.

It may be provided that at least one of the bayonet arms with connecting section has a start-up slope between its free end and its oversized area. The start-up slope can lead from the free end or behind it to the oversized area. This allows for easy fitting of the bayonet element to the oversized area along the start-up slope.

In addition, it may be provided that one of the bayonet arms is designed as a resilient bayonet arm which is elastic with respect to the main body of the fan mount counter the axial direction. The resilient design of a bayonet arm allows for easy mounting and disassembly of the fan from the fan mount.

It may be provided that a slot is formed between the resilient bayonet arm and an edge area of the main body. The slot allows for the bayonet arm to be spring-loaded by means of its connecting section. Accordingly, it may be provided that the resilient bayonet arm is fastened to the main body solely by means of the connecting section.

Furthermore, it may be provided that the resilient bayonet arm has a latching protrusion for one of the bayonet elements. The latching protrusion may be located between the free end of the bayonet arm and the connecting section, in particular in the oversized area. Consequently, the latching protrusion secures the bayonet element in the corresponding bayonet guide against unintentional release of the fan from the fan mount in a direction counter to the rotational direction. The latching protrusion may be formed in particular as a latching nose with a start-up slope.

In addition, it may be provided that the resilient bayonet arm has an actuating lever which is configured to move the spring-loaded bayonet arm in the direction counter to the axial direction when actuating the actuation lever. The actuating lever may be located at the free end of the resilient bayonet arm. The actuating lever may extend as an elongated projection from the bayonet arm in the direction counter to the axial direction. The actuating lever thus enables elastic movement of the resilient bayonet arm in the direction counter to the axial direction particularly comfortably and without additional tools.

In addition, it may be provided that the bayonet elements are designed as tabs. Designed as tabs, the bayonet elements can be formed particularly easily and can be easily rotated into the bayonet guides. The tabs can have a partially round or partially circular end. Such an end allows for adjustment with respect to an adjustment element by point system or stop.

It may also be provided that the fan has four bayonet elements, and the fan mount has four bayonet guides. Equipped with four bayonet elements and four bayonet guides, a particularly secure attachment of the fan to the fan mount is possible.

It may be provided that the fan has a rectangular or substantially rectangular frame and in each case one of the bayonet elements is arranged at each of the corners of the rectangular frame. The bayonet elements can extend, in particular formed as tabs, in a plane with the frame of the fan. The rectangular frame can have two parallel sides of different lengths. In other words, the rectangular frame may not be a square frame with sides of equal length. As a result, it can be easily determined by corresponding design of the fan mount that the fan can only be fastened to the fan mount in two mounting positions. A single mounting position of the fan on the fan mount may be provided in addition or alternatively by forming corresponding main body projections extending from the main body in the direction counter to the axial direction.

According to a second aspect of the invention, the object is achieved by a headlight for a motor vehicle having a fan system according to the first aspect of the invention and at least one illuminant.

The illuminant can be any light source for a headlight, for example a light-emitting diode. The fan system may also have a heat sink. The heat sink can be located in the axial direction behind the fan. The illuminant may be in thermal contact with the heat sink. In this respect, the illuminant may be arranged in the axial direction behind the fan and the heat sink.

The headlight has a housing to which the fan mount is attached. The fan mount may, for example, have one or more screw holes, with or without thread, to which the fan mount can be screwed to the housing with the help of screws. Furthermore, the fan mount may have a hole for strain relief by means of a cable tie. This avoids strain on a plug of the fan.

According to a third aspect of the invention, the object is achieved by a motor vehicle having at least one headlight according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
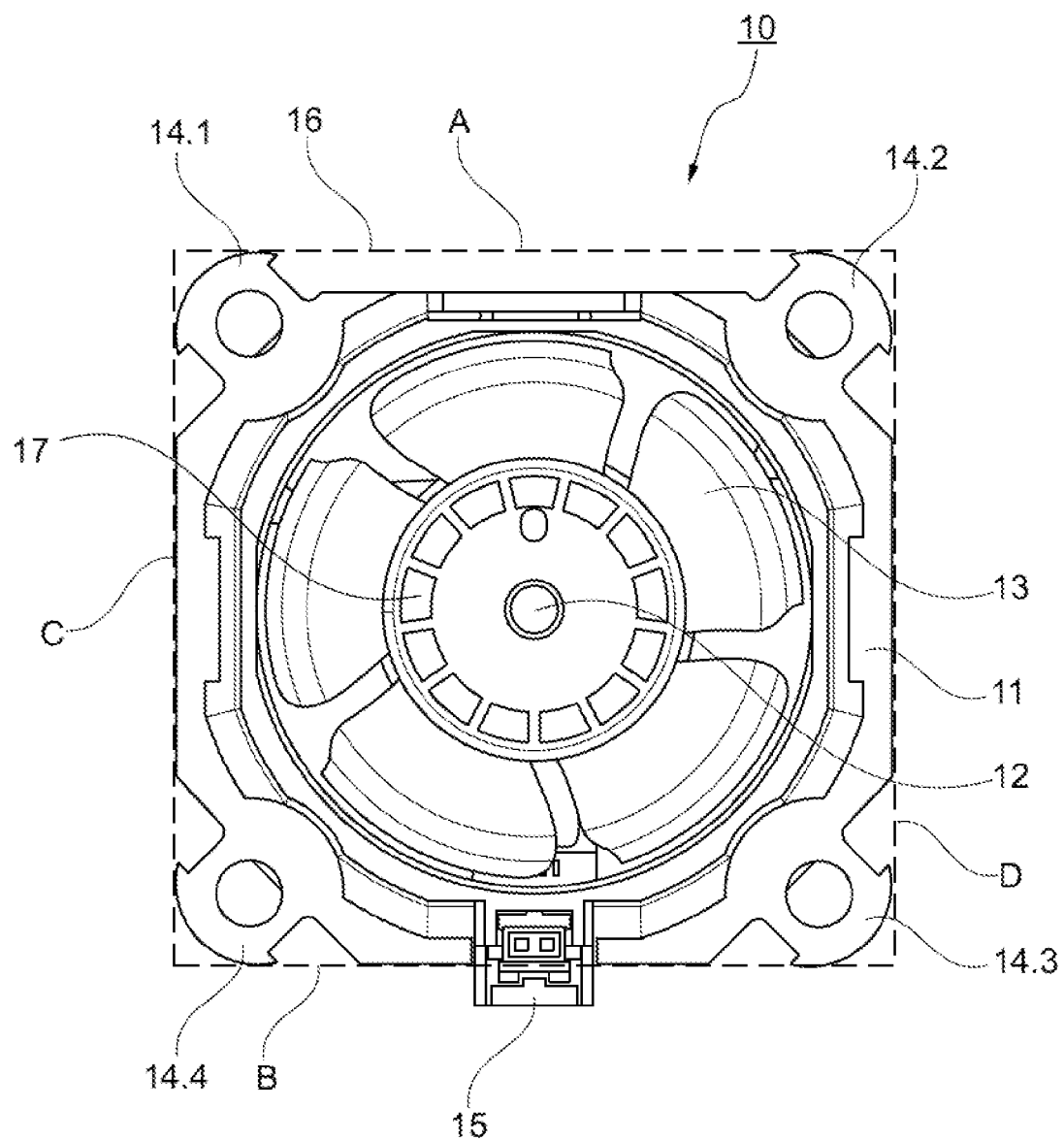
FIG. 1 is a top view of a fan according to an example of a fan system of the invention from FIG. 3.
Figure 2:
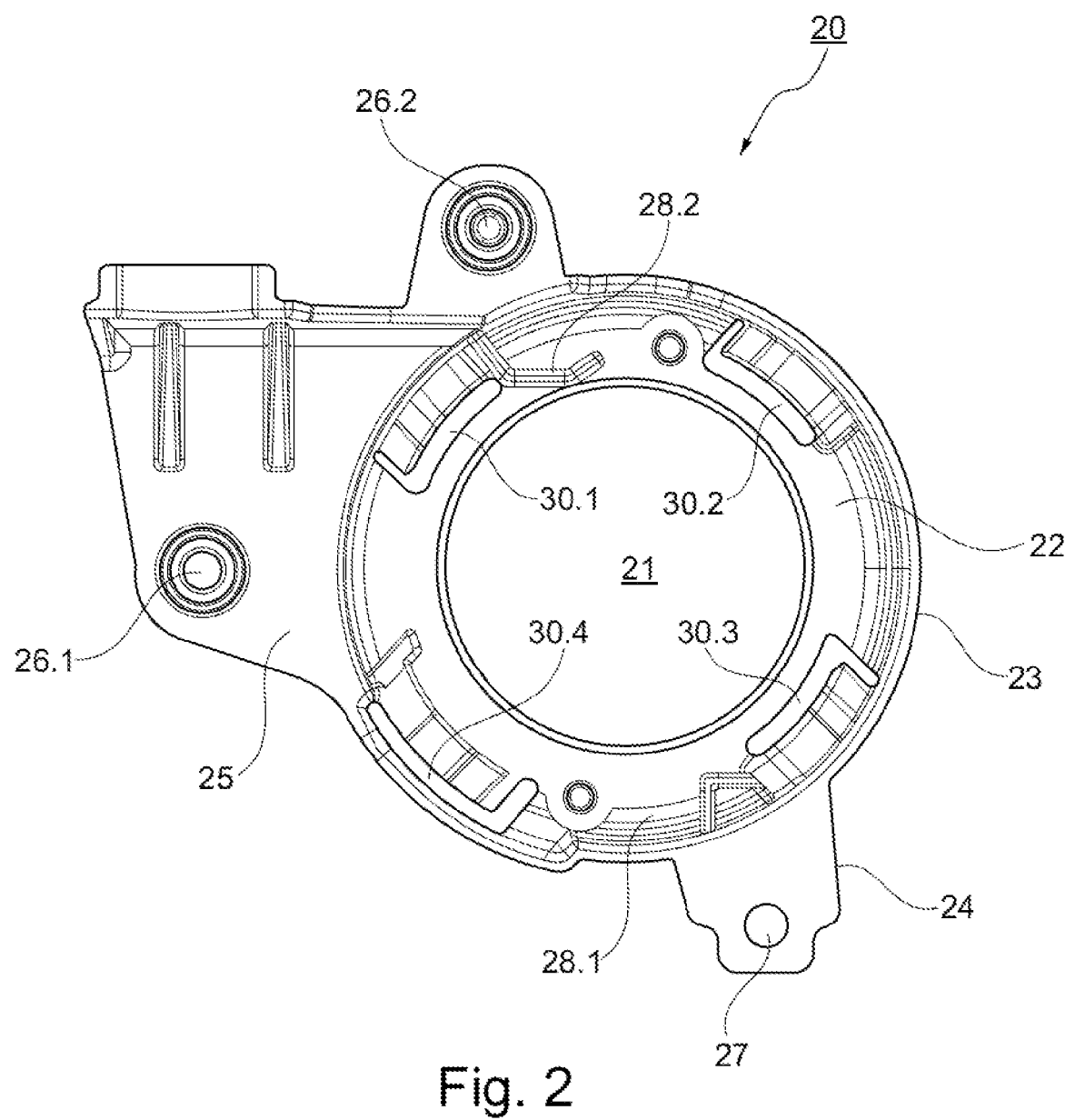
FIG. 2 is a top view of a fan mount according to an example of a fan system of the invention from FIG. 3.
Figure 3:
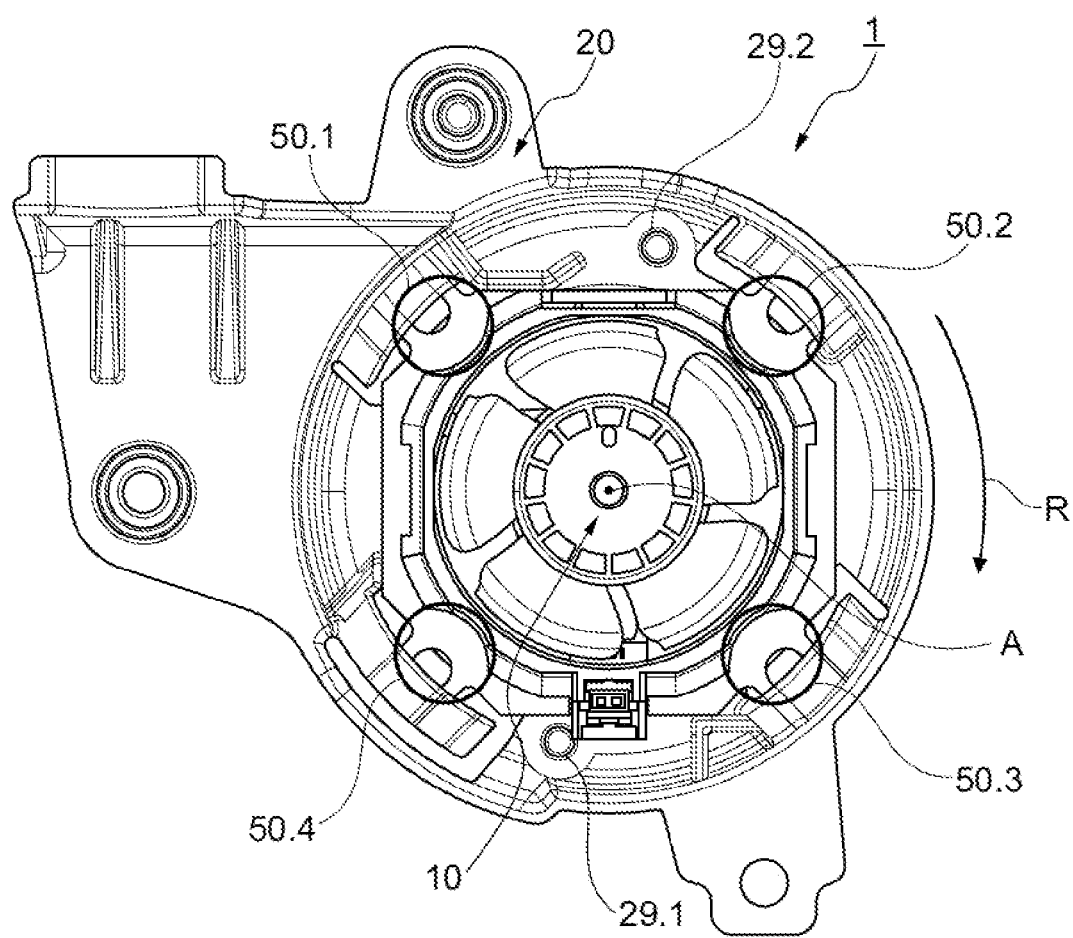
FIG. 3 is a top view of an example of a fan system of the invention.

FIG. 1 shows a fan 10 according to an embodiment of a fan system 1 according to the invention (see FIG. 3). The fan 10 includes a frame 11. The frame 11 has an essentially rectangular shape. The rectangle 16 of this rectangular shape, which can be placed around the fan 10 or with which it can be outlined, has four sides A, B, C and D. Sides A and B are parallel to each other and of equal length. Sides C and D are also parallel to each other and of equal length. Sides A and B are different lengths from sides C and D, in particular sides A and B are shorter than sides C and D. As a result, the fan 10 with its frame 11 only fits in two mounting positions in the fan mount 20 from FIG. 2. This will be explained in more detail later with reference to FIG. 3.

The fan 10 further comprises a rotor 12 and impellers 13 attached thereto for cooling or ventilating an illuminant 62 of a headlight 60 (see FIG. 8) or a heat sink with which the illuminant 62 is thermally contacted. The rotor 12 is driven by an electric motor 17. The frame 11 delimits the wheels 13.

At each corner of the frame 11 is a bayonet element 14.1, 14.2, 14.3, 14.4 in the form of a tab. The number of bayonet elements 14 can also be more or less than four. The bayonet elements 14.1, 14.2, 14.3, 14.4 have a partially round or partially circular end. On the frame 11 is also a plug 15 for the electrical connection of an energy source and optionally a control unit to the electric motor 17.

FIG. 2 shows the fan mount 20 of the fan system 1 from FIG. 3. The fan mount 20 has a round main body 22. A recess 21 for receiving the fan 10 is located in the main body 22. The recess 21 is round in the present case. The fan 10 is plugged through the recess 21 into the fan mount 20 in an axial direction Z for fastening to the fan mount 20 (see FIGS. 3 and 5).

The fan mount 20 further comprises four bayonet guides 30.1, 30.2, 30.3, 30.4. The number of bayonet guides 30 can also be more or less than four. The number of bayonet guides 30 may in particular correspond to the number of bayonet elements 14. The bayonet elements 14.1, 14.2, 14.3, 14.4 are moved into the fan mount 20 into the bayonet guides 30.1, 30.2, 30.3, 30.4 by a rotational movement in the rotational direction R (see FIG. 3) after the plugging movement of the fan 10 in the axial direction Z, and fixed or clamped there. Accordingly, a bayonet joint 50 is formed, which in the present case comprises four parts of the bayonet joint 50, which are designated as 50.1, 50.2, 50.3, 50.4 (see FIG. 3).

The fan mount 20 also has main body protrusions 28.1, 28.2 on its main body 22, wherein only one such main body protrusion 28 can be provided. The main body protrusions 28.1, 28.2 extend from the round main body 22 counter to the axial direction Z. They are provided at or near the bayonet guides 30.1, 30.3 which are transversely opposite each other. Together with the rectangular shape of the frame 11 of the fan 10 with the rectangle 16, which is not square, this allows for the determination of a single mounting position of the fan 10 on the fan mount 20. This ensures that the plug 15 is only located in the position shown on side B of the rectangle 16 (see FIG. 1) and thus optimally reachable for a plug, in the housing 61 of the headlight 60. By the main body protrusion 28.1 it is thus avoided that the plug 15 is located on side A of the rectangle 16, i.e., on side A, opposite the intended side B. By the rectangular shape of the frame 11 of the fan 10, which deviates from a square, it is avoided that the plug 15 is located on side C or D of the rectangle 16. This allows for only one possible mounting position.

On the round main body 22 are functional pieces 24, 25 of the fan mount 20. The functional piece 24 has a hole 27 for strain relief by means of a cable tie. As a result, a load on the plug 15 can be avoided or at least reduced. The function piece 25 is used for fastening to the housing 61 of the headlight 60. By means of two screw holes 26.1, 26.2 in the function piece 25, the fan mount 20 can be screwed to the housing 61.

The fan mount 20 also has two thread areas 29.1, 29.2 for self-tapping screws on its main body 22. There may also be only one thread area 29 provided. The thread areas 29.1, 29.2 are reinforced or strong areas of the main body 22. Self-tapping screws can furrow a thread into the material of the main body 22 in these thread areas 29.1, 29.2. As a result, the bayonet joint 50 can be secured by means of self-tapping screws even if one or more of the bayonet elements 14 and/or the bayonet guides 30 are damaged.

Figure 4:
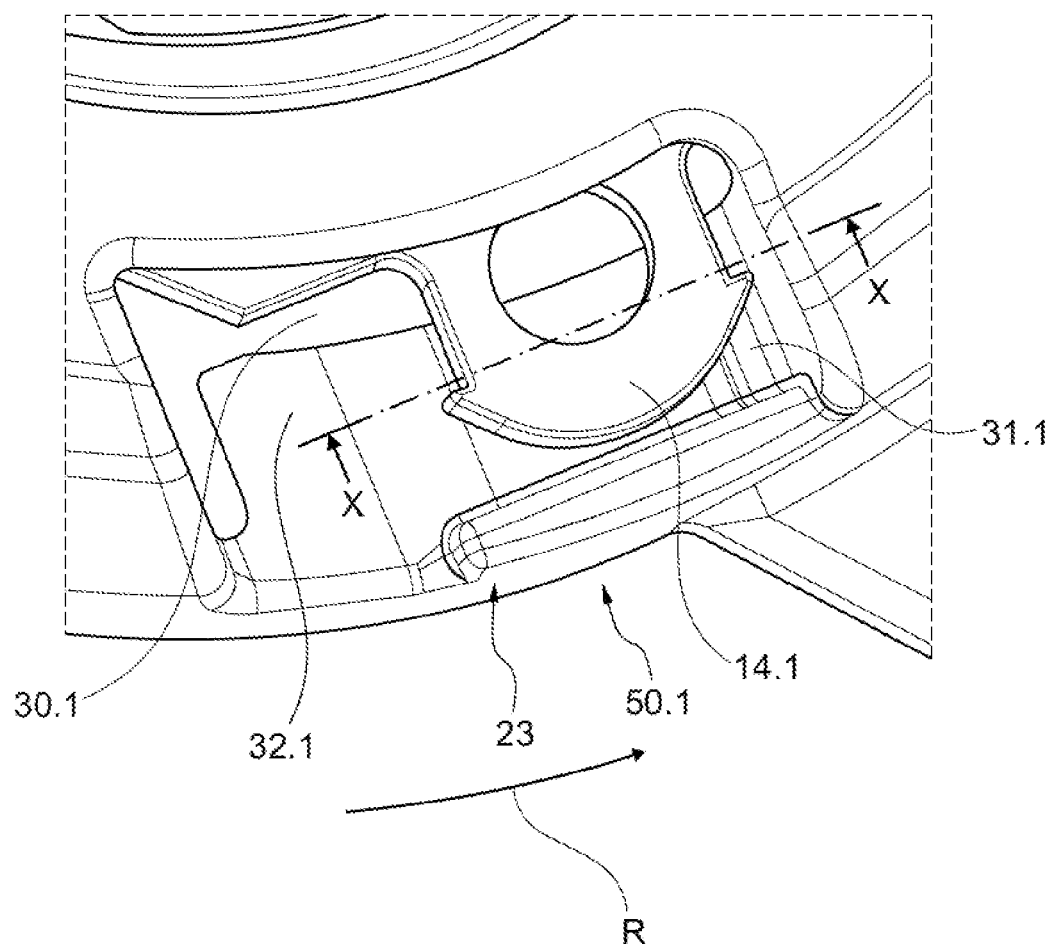
FIG. 4 is a detailed view of a part of the bayonet joint of the fan system from FIG. 3.

FIG. 4 shows a detailed view of the portion of the bayonet joint 50.1 with the bayonet element 14.1 and the bayonet guide 30.1. The bayonet element 14.1 is applied in the rotational direction R against a connecting section 31.1, which acts as a stop.

Figure 5:
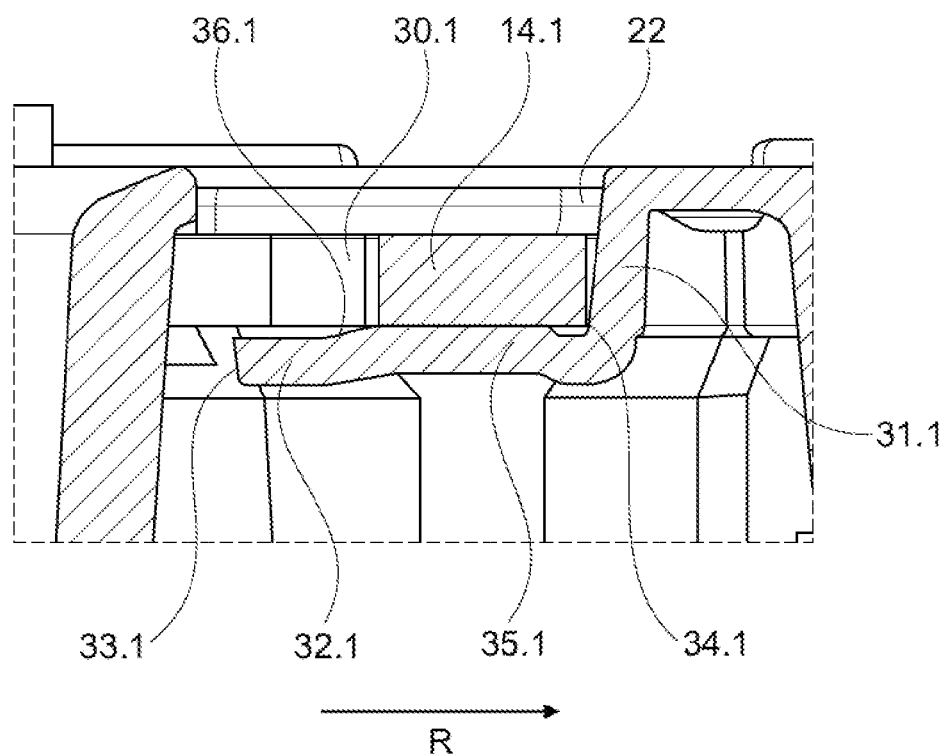
FIG. 5 is a sectional view through the part of the bayonet joint from FIG. 4.

Further details of the part of the bayonet joint 50.1 are shown in FIG. 5, which shows a cut along the line X-X in FIG. 4. Here it can be seen that the bayonet guide 30.1 is formed between the main body 22 and a bayonet arm 32.1. The bayonet arm 32.1 has a connecting section 31.1 by means of which it is connected to the main body 22. The connecting section 31.1 extends substantially perpendicular to the main body 22 and counter to the axial direction Z. It is therefore angled in relation to the main body 22. Likewise, the bayonet arm 32.1 extends angled with respect to the connecting section 31.1. In particular, the bayonet arm 32.1 extends substantially perpendicular from the connecting section 31.1 and counter to the rotational direction R.

The bayonet arm 32.1 has a free end 33.1 opposite the connecting section 31.1. The bayonet arm 32.1 extends in the direction from the free end 33.1 to the connecting section 31.1 with start-up slope 36.1 to an oversized area 35.1 with respect to the main body 22. The oversized area 35.1 clamps the bayonet element 14.1 between the main body 22 and the bayonet arm 32.1. Furthermore, by means of the abutment 34.1, the bayonet arm 32.1 is located at the connecting section 31.1 designed as a stop. As a result, the part of the bayonet joint 50.1 is securely fixed in the axial direction Z and in the rotational direction R.

As FIG. 4 shows, the bayonet arm 32.1 is connected to an edge region 23 of the main body 22. The edge area 23 is here the outer circumference or it is located on the outer circumference of the main body 22. The edge region 23 is formed in the present case with an adjustment or tolerance element. The adjustment or tolerance element is in the present case a wall of the edge area 23. This provides tolerance compensation for the bayonet arm 32.1 and an adjustment so that the bayonet arm 32.1 does not protrude over the edge area 23 or the adjustment or tolerance element. Due to the partially round or partially circular end of the bayonet element 14.1, adjustment or tolerance compensation, in particular a point system with the adjustment or tolerance element, may occur.

Figure 6:
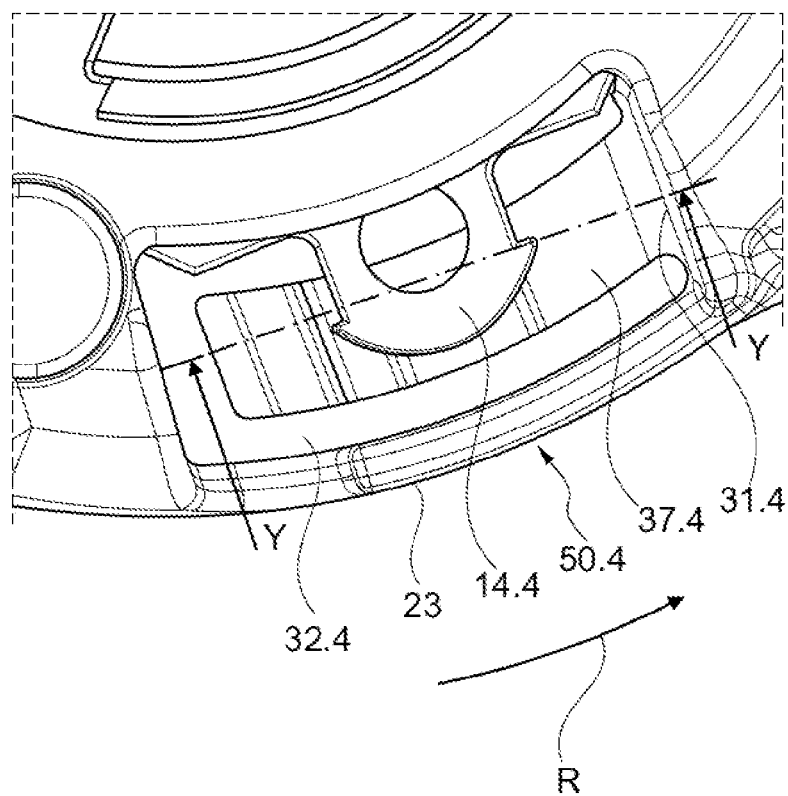
FIG. 6 is a detailed view of another part of the bayonet joint of the fan system from FIG. 3.
Figure 7:
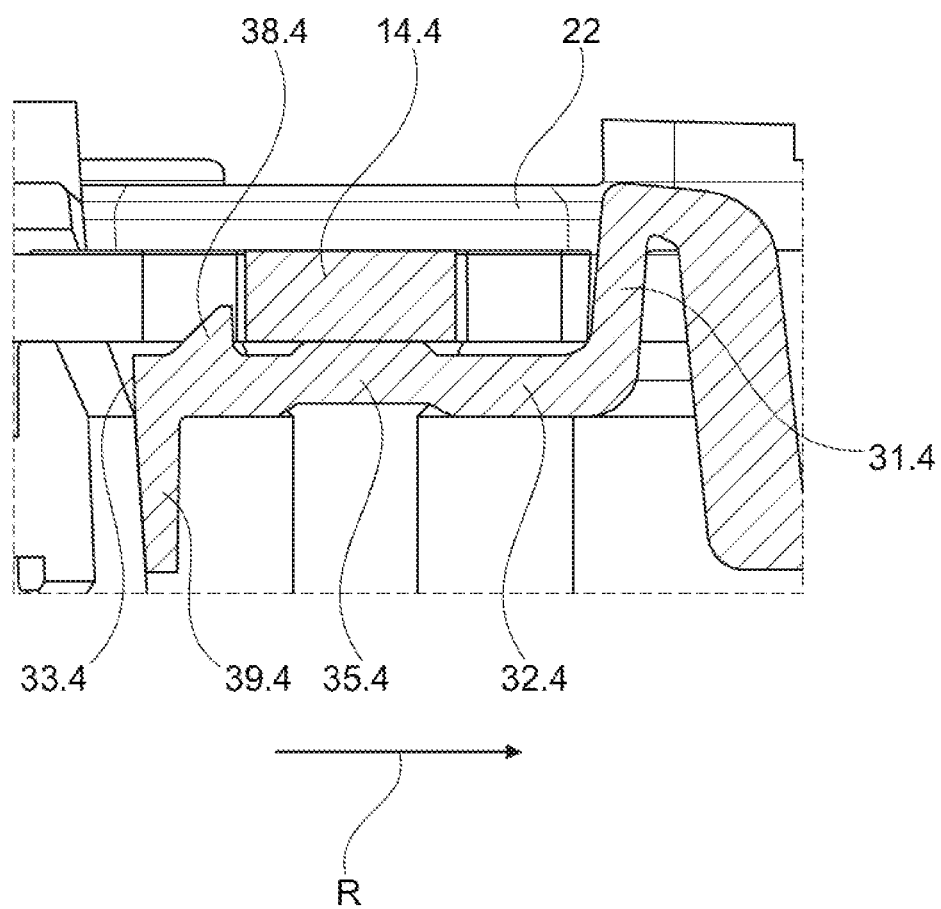
FIG. 7 is a sectional view through the other part of the bayonet joint from FIG. 6.

The parts of the bayonet joint 50.2, 50.3 are identical to the part of the bayonet joint 50.1 described with reference to FIGS. 4 and 5. However, as shown in FIGS. 6 and 7, the part of the bayonet joint 50.4 is different from the parts of the bayonet joint 50.1, 50.2, 50.3. The bayonet element 14.4 corresponds in its shape to the other bayonet elements 14.1, 14.2, 14.3, but the bayonet arm 32.4 is designed as a resilient bayonet arm 32.4.

As shown in FIG. 6, the resilient bayonet arm 32.4 is separated by a slot 37.4 from the edge region 23 of the main body 22. Also, the bayonet element 14.4 is not located at a stop with the connecting section 31.4 of the resilient bayonet arm 32.4.

As FIG. 7 shows as a sectional view along the line Y-Y by FIG. 6, the resilient bayonet arm 32.4 is adjustable or movable in a direction counter to the axial direction by means of an operating lever 39.4. The actuating lever 39.4 is located at the free end 33.4 of the resilient bayonet arm 32.4. A latching protrusion 38.4 between the oversized area 35.4 and the free end 33.4 secures the bayonet element 14.4 in the bayonet guide 30.4 additionally in the direction counter to the rotational direction R before releasing from the mounting position of the fan 10 on the fan mount 20 by means of the bayonet joint 50.

In the present case, the fan mount 20 with all its components is designed in one piece. Likewise, the frame 11 of the fan 10 with the bayonet elements 14.1, 14.2, 14.3, 14.4 is designed in one piece. This facilitates production. The fan mount 20 may, for example, be made of a plastic. The fan 10 may be made of a metal.

Figure 8:
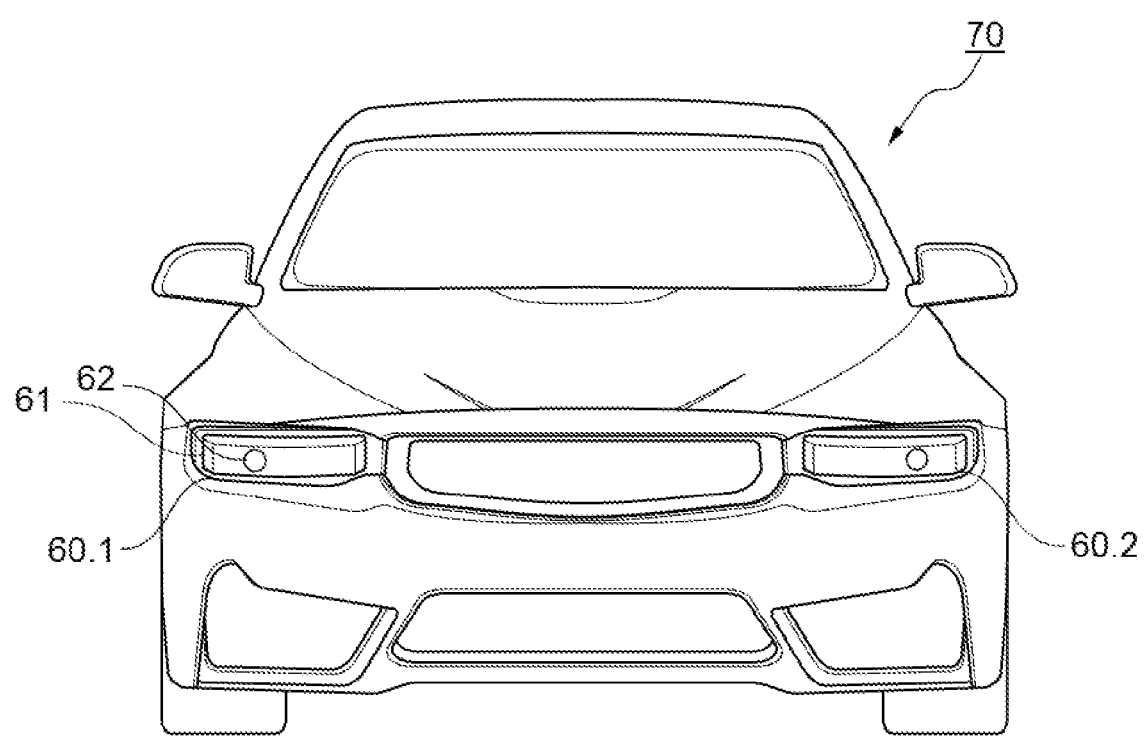
FIG. 8 is a front view of an example of a motor vehicle according to the invention with the fan system from FIG. 3.

FIG. 8 shows a motor vehicle 70 according to an embodiment of the invention having two identical headlights 60.1, 60.2. Each of the headlights 60.1, 60.2 contains the fan system 1 from FIG. 3. In the present case, a housing 61 on which the fan system 1 is located, and an illuminant 62 of the headlight 60.1 are described by way of example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fan system for a headlight of a motor vehicle, the fan system comprising:
   a fan mount that is designed to be fastened to a housing of the headlight, the fan mount including a main body;
   at least two bayonet arms extending spaced apart from the main body and defining at least two bayonet guides; and
   a fan that comprises at least two bayonet elements,
   wherein the at least two bayonet arms and the at least two bayonet elements form a bayonet joint, the fan fastened to the fan mount via a plug-in movement of the fan into the fan mount in an axial direction and a rotational movement of the bayonet elements into the bayonet guides in a rotational direction, such that each of the bayonet elements is secured against the main body by a corresponding one of the bayonet arms.

2. The fan system according to claim 1, wherein at least one of the bayonet elements is formed as a tab.

3. The fan system according to claim 1, wherein the fan comprises four bayonet elements and the fan mount comprises four bayonet guides.

4. The fan system according to claim 3, wherein the fan has a rectangular or substantially rectangular frame and in each case one of the bayonet elements is arranged at each of the corners of the rectangular frame.

5. A headlights for a motor vehicle comprising a fan system according to claim 1 and at least one illuminant.

6. A motor vehicle comprising at least one headlight according to claim 5.

7. The fan system according to claim 1, wherein one of the bayonet arms is formed as a resilient bayonet arm, which in the direction counter to the axial direction is elastic with respect to the main body of the fan mount.

8. The fan system according to claim 7, wherein a slot is formed between the resilient bayonet arm and an edge region of the main body.

9. The fan system according to claim 7, wherein the resilient bayonet arm has a latching protrusion for one of the bayonet elements.

10. The fan system according to claim 7, wherein the resilient bayonet arm comprises an actuating lever which is configured to move the resilient bayonet arm in the direction counter to the axial direction when actuating the actuating lever.

11. The fan system according to claim 1, wherein at least one of the bayonet arms comprises a connecting section, via which the at least one bayonet arm is fastened to the main body and which extends transversely to the main body and in a direction counter to the axial direction.

12. The fan system according to claim 11, wherein the at least one connecting section forms a stop to which one of the bayonet elements is applied or applies when the fan is fastened to the fan mount.

13. The fan system according to claim 11, wherein the at least one bayonet arm with the connecting section also has a free end and extends from its end opposite the free end transversely from the connecting section and counter to the rotational direction.

14. The fan system according to claim 13, wherein at least one of the bayonet arms with the connecting section has an oversized area in which one of the bayonet elements is fixed between the main body and the bayonet arm when the fan is fastened to the fan mount.

15. The fan system according to claim 14, wherein at least one of the bayonet arms with the connecting section has a start-up slope between its free end and its oversized area.

* * * * *